(12) United States Patent
Lee et al.

(10) Patent No.: US 8,555,319 B2
(45) Date of Patent: Oct. 8, 2013

(54) SERVICE GUIDE TRANSMISSION/RECEPTION METHOD AND APPARATUS FOR BROADCAST SERVICE

(75) Inventors: Jong Hyo Lee, Pyeongtaek-si (KR); Bo Sun Jung, Seongnam-si (KR); Sung Oh Hwang, Yongin-si (KR); Kook Heui Lee, Yeongtong-gu (KR)

(73) Assignee: Samsung Electronics Co., Ltd (KR)

( * ) Notice: Subject to any disclaimer, the term of this patent is extended or adjusted under 35 U.S.C. 154(b) by 601 days.

(21) Appl. No.: 12/630,265

(22) Filed: Dec. 3, 2009

(65) Prior Publication Data

US 2010/0138872 A1 Jun. 3, 2010

(30) Foreign Application Priority Data

Dec. 3, 2008 (KR) ........................ 10-2008-0121674

(51) Int. Cl.
  *H04N 7/173* (2011.01)
  *H04N 21/2543* (2011.01)
  *H04N 5/445* (2011.01)
  *H04N 7/16* (2011.01)

(52) U.S. Cl.
  USPC ............................ 725/50; 725/62; 455/432.2

(58) Field of Classification Search
  USPC ........... 725/62, 39, 46, 47, 54, 50; 455/432.2, 455/418, 419; 379/201.02, 201.12
  See application file for complete search history.

(56) References Cited

U.S. PATENT DOCUMENTS

| | | | | |
|---|---|---|---|---|
| 7,974,613 B1 * | 7/2011 | Shanker et al. | ................ | 455/419 |
| 2004/0242216 A1 * | 12/2004 | Boutsikakis | .................. | 455/418 |
| 2007/0101391 A1 * | 5/2007 | Hwang | .......................... | 725/131 |
| 2008/0045155 A1 * | 2/2008 | Lee et al. | ...................... | 455/66.1 |
| 2008/0070495 A1 * | 3/2008 | Stricklen et al. | ............. | 455/3.01 |
| 2008/0127290 A1 | 5/2008 | Delegue et al. | | |
| 2008/0194231 A1 * | 8/2008 | Kim et al. | ..................... | 455/411 |
| 2009/0094644 A1 * | 4/2009 | Jung et al. | ........................ | 725/39 |
| 2010/0037258 A1 * | 2/2010 | Chitturi et al. | .................. | 725/39 |
| 2010/0138872 A1 * | 6/2010 | Lee et al. | .......................... | 725/54 |
| 2011/0099587 A1 * | 4/2011 | O'Neil | ............................ | 725/62 |
| 2011/0219095 A1 * | 9/2011 | Lee et al. | ...................... | 709/218 |

FOREIGN PATENT DOCUMENTS

| | | |
|---|---|---|
| EP | 1 753 166 | 2/2007 |
| JP | 2008-22550 | 1/2008 |
| KR | 1020070049020 | 5/2007 |
| WO | WO 2007/042937 | 4/2007 |
| WO | WO 2007-052976 | 5/2007 |

OTHER PUBLICATIONS

Philipp Steckel, "Mobile Broadcasting: Advanced Services using Innovative Electronic Service Guides", 2008 IEEE International Symposium on Broadband Multimedia Systems and Broadcasting, Mar. 31, 2008.

(Continued)

*Primary Examiner* — Pankaj Kumar
*Assistant Examiner* — Reuben M Brown
(74) *Attorney, Agent, or Firm* — The Farrell Law Firm, P.C.

(57) ABSTRACT

Service guide transmission/reception methods and apparatuses for providing users with a service guide supporting multiplay service are provided. Service guide delivery information is received at a terminal. Device class grouping information is extracted from the Service guide delivery information. A Service Guide Data Unit (SGDU) having service guide information required for composing a service guide matched to the terminal is received. The service guide composed using the service guide information received by means of the SGDU is displayed.

8 Claims, 5 Drawing Sheets

(56) References Cited

OTHER PUBLICATIONS

Open Mobile Alliance: "Service Guide for Mobile Broadcast Services, Draft Version 1.0", OMA-TS-BCAST_ServiceGuide-V1_0_0-20070123-D, Jan. 23, 2007.

Allamandri et al., "Service Platform for Converged Interactive Broadband Broadcast and Cellular Wireless", IEEE Transactions on Broadcasting, vol. 53, No. 1, Mar. 1, 2007.

Open Mobile Alliance: "User Agent Profile, Approved Version 2.0", OMA-TS-UAProf-V2_0-20060206-A, Feb. 6, 2006.

* cited by examiner

SERVICE GUIDE TRANSMISSION/RECEPTION METHOD AND APPARATUS FOR BROADCAST SERVICE

PRIORITY

This application claims priority under 35 U.S.C. §119(a) to an application entitled "SERVICE GUIDE TRANSMISSION/RECEPTION METHOD AND APPARATUS FOR BROADCAST SERVICE" filed in the Korean Intellectual Property Office on Dec. 3, 2008 and assigned Serial No. 10-2008-0121674, the content of which is incorporated herein by reference.

BACKGROUND OF THE INVENTION

1. Field of the Invention

The present invention relates generally to broadcast services and, more particularly, to service guide transmission/reception methods and apparatuses that provide users with a service guide supporting a multiplay service.

2. Description of the Related Art

A broadcast service is capable of being received by all users having broadcast receivers. Broadcast services can be roughly divided into two categories, namely, a radio broadcast service carrying only audio and a multimedia broadcast service carrying audio, video and data. Such broadcast services have developed from analog services to digital services. Recently, various types of broadcasting systems (such as a cable broadcasting system, a satellite broadcasting system, and a hybrid broadcasting system using both a cable network and a satellite) have been developed that provide high quality audio and video broadcast services along with a high-speed data service.

When existing technologies are recombined or integrated, the mobile communication market is required to support new services. The development of communication and broadcast technologies has allowed users to enjoy broadcast services while on the move through the use of portable devices, such as mobile phones and Personal Digital Assistants (PDAs). Due to potential and actual market needs, an increase in user demand for multimedia services, intended strategies for providing new services such as broadcast and voice services, and identified interests of Information Technology (IT) companies that bolster their mobile communication businesses to meet user demands, the convergence of mobile communication services and Internet Protocol (IP) has become a priority in developing the next generation of mobile communication technologies. This convergence has resulted in the introduction and application of various wireless/broadcast services in both the mobile communication market and the general wire communication market. Further, this convergence has merged the consumption environment for different wire and wireless broadcast services.

Open Mobile Alliance (OMA), which studies a standard for interworking between individual mobile solutions, serves to define various application standards for mobile games and Internet services. OMA Mobile Broadcast Services Enabler Suite (OMA BCAST) is an open global specification designed to support mobile broadcast technologies. The OMA BCAST standardizes technologies that provide IP-based mobile content delivery, which includes a variety of functional areas such as a service guide, downloading and streaming, service and content protection, service subscription, and roaming.

Further, due to the fixed-mobile convergence trend, mobile broadcast technologies, such as OMA BCAST, have evolved to provide a service in a fixed-mobile integrated environment.

FIG. 1 is a block diagram illustrating logical architecture of a BCAST system specified by OMA BCAST working group in an application layer and a transport layer.

As shown in FIG. 1, the logical architecture of the BCAST system includes a Content Creation (CC) 101, a BCAST Service Application 102, a BCAST Service Distribution/Adaptation (BSDA) 103, a BCAST Subscription Management (BSM) 104, a Terminal 105, a Broadcast Distribution System (BDS) Service Distribution 111, a BDS 112, and an Interworking Network 113.

The Content Creation (CC) 101 provides content that is the basis of BCAST services. The content may include files for common broadcast services, e.g., data for a movie including audio and video. The Content Creation 101 provides a BCAST Service Application 102 with attributes for the content, which are used to create a service guide and to determine a transmission bearer over which the services will be delivered.

The BCAST Service Application 102 receives data for BCAST services provided from the Content Creation 101, and converts the received data into a form suitable for providing media encoding, content protection, interactive services, etc. The BCAST Service Application 102 provides the attributes for the content, which is received from the Content Creation 101, to the BSDA 103 and the BSM 104.

The BSDA 103 performs operations, such as file/streaming delivery, service gathering, service protection, service guide creation/delivery and service notification, using the BCAST service data provided from the BCAST Service Application 102. The BSDA 103 adapts the services to the BDS 112.

The BSM 104 manages, via hardware or software, service provisioning, such as subscription and charging-related functions for BCAST service users, information provisioning used for BCAST services, and mobile terminals that receive the BCAST services.

The Terminal 105 receives content/service guide and program support information, such as content protection, and provides a broadcast service to a user. The BDS Service Distribution 111 delivers mobile broadcast services to a plurality of terminals through mutual communication with the BDS 112 and the Interaction Network 113.

The BDS 112 delivers mobile broadcast services over a broadcast channel, and may include, for example, a Multimedia Broadcast Multicast Service (MBMS) by 3rd Generation Project Partnership (3GPP), a Broadcast Multicast Service (BCMCS) by 3rd Generation Project Partnership 2 (3GPP2), a DVB-Handheld (DVB-H) by Digital Video Broadcasting (DVB), or an Internet Protocol (IP) based broadcasting communication network. The Interaction Network 113 provides an interaction channel, and may include, for example, a cellular network.

The reference points, or connection paths between the logical entities of FIG. 1, have a plurality of interfaces according to their purposes. The interfaces are used for communication between two or more logical entities for their specific purposes. A message format, a protocol and the like are applied for the interfaces.

BCAST-1 121 is a transmission path for content and content attributes, and BCAST-2 122 is a transmission path for a content-protected or content-unprotected BCAST service, attributes of the BCAST service, and content attributes.

BCAST-3 123 is a transmission path for attributes of a BCAST service, attributes of content, user preference/subscription information, a user request, and a response to the request. BCAST-4 124 is a transmission path for a notification message, attributes used for a service guide, and a key used for content protection and service protection.

BCAST-5 125 is a transmission path for a protected BCAST service, an unprotected BCAST service, a content-protected BCAST service, a content-unprotected BCAST service, BCAST service attributes, content attributes, a notification, a service guide, security materials such as a Digital Right Management (DRM) Right Object (RO) and key values used for BCAST service protection, and all data and signaling transmitted through a broadcast channel.

BCAST-6 126 is a transmission path for a protected BCAST service, an unprotected BCAST service, a content-protected BCAST service, a content-unprotected BCAST service, BCAST service attributes, content attributes, a notification, a service guide, security materials such as a DRM RO and key values used for BCAST service protection, and all data and signaling transmitted through an interaction channel.

BCAST-7 127 is a transmission path for service provisioning, subscription information, device management, and user preference information transmitted through an interaction channel for control information related to receipt of security materials, such as a DRM RO and key values used for BCAST service protection.

BCAST-8 128 is a transmission path through which user data for a BCAST service is provided. BDS-1 129 is a transmission path for a protected BCAST service, an unprotected BCAST service, BCAST service attributes, content attributes, a notification, a service guide, and security materials, such as a DRM RO and key values used for BCAST service protection.

BDS-2 130 is a transmission path for service provisioning, subscription information, device management, and security materials, such as a DRM RO and key values used for BCAST service protection.

X-1 131 is a reference point between the BDS Service Distribution 111 and the BDS 112. X-2 132 is a reference point between the BDS Service Distribution 111 and the Interaction Network 113. X-3 133 is a reference point between the BDS 112 and the Terminal 105. X-4 134 is a reference point between the BDS Service Distribution 111 and the Terminal 105 over a broadcast channel. X-5 135 is a reference point between the BDS Service Distribution 111 and the Terminal 105 over an interaction channel. X-6 136 is a reference point between the Interaction Network 113 and the Terminal 105.

Referring now to FIG. 2 a diagram illustrates a structure of a service guide for use in the OMA BCAST system. In FIG. 2, solid arrows between fragments indicate reference directions between the fragments.

The service guide includes an Administrative Group 200 for providing basic information about the entire service guide, a Provisioning Group 210 for providing subscription and purchase information, a Core Group 220 that acts as a core part of the service guide, and an Access Group 230 for providing access information that control access to services and content.

The Administrative Group 200 includes a Service Guide Delivery Descriptor (SGDD) block 201. The Provision Group 210 includes a Purchase Item block 211, a Purchase Data block 212, and a Purchase Channel block 213. The Core Group 220 includes a Service block 221, a Schedule block 222, and a Content block 223. The Access Group 230 includes an Access block 231 and a Session Description block 232.

The service guide further includes Preview Data 241 and Interactivity Data 251 in addition to the four information groups 200, 210, 220, and 230.

The aforementioned components are referred to as basic units constituting the service guide.

The SGDD fragment 201 provides information about a delivery session where a Service Guide Delivery Unit (SGDU) is located. The SGDU is a container that contains service guide fragments 211, 212, 213, 221, 222, 223, 231, 232, 241, and 251, which constitute the service guide. The SGDD also provides the information on the entry points for receiving the grouping information and notification messages.

The Service fragment 221, which is an upper aggregate of the content included in the broadcast service, includes information on service content, genre, service location, etc.

The Access fragment 231 provides access-related information for allowing the user to view the service and delivery method, and session information associated with the corresponding access session. The Session Description fragment 232 may be included in the Access fragment 231, and provides location information in a Uniform Resource Identifier (URI) form so that the terminal may detect information on the Session Description fragment 232. The Session Description fragment 232 provides address information, codec information, etc., about multimedia content existing in the session.

The Purchase Item fragment 211 provides a bundle of service, content, time, etc., to help the user subscribe to or purchase the Purchase Item fragment 211. The Purchase Data fragment 212 includes detailed purchase and subscription information, such as price information and promotion information, for the service or content bundle. The Purchase Channel fragment 213 provides access information for subscription or purchase.

The SGDD also provides information regarding entry points for receiving the service guide and grouping information about the SGDU as the container.

The Preview Data fragment 241 may be used to provide preview information for a service, schedule, and content. The Interactivity Data fragment 251 may be used to provide an interactive service according to the service, schedule, and content during broadcasting. Detailed information about the service guide can be defined by various elements and attributes that provide detailed content and values based on the upper data model of FIG. 2.

Although not depicted, the fragments that constitute the service guide may include element and attribute values for fulfilling their purposes.

FIG. 3 is a block diagram illustrating a principle of the conventional service guide delivery method.

The Service Guide Deliver Descriptor fragment 201 includes the session information, grouping information, and notification message access information related to all fragments containing service information.

Referring to FIG. 3, when the mobile broadcast service-enabled terminal 105 turns on or begins to receive the service guide, it accesses a Service Guide Announcement Channel (SG Announcement Channel) 300.

The SG Announcement Channel 300 includes at least one SGDD 200 (e.g., SGDD #1, . . . , SGDD #2, SGDD #3), which are formatted as shown in Table 1.

TABLE 1

| Name | Type | Category | Cardinality | Description | Data Type |
|---|---|---|---|---|---|
| ServiceGuide-Delivery-Descriptor | E | | | The Service Guide Delivery Descriptor Contains the following attributes: Idversion Contains the following elements: NotificationReception BSMList DescriptorEntry | |
| Id | A | NM/TM | 0 . . . 1 | Unique identifier of the SGDD within one specific SG | Any URI |
| Version | A | NM/TM | 0 . . . 1 | Version of SGDD. The newer version overrides the older one as soon as it has been received. | Un-signed-Int |
| Notification-Reception | E1 | NM/TM | 0 . . . 1 | Reception information for general Notification Messages. In case of delivery over Broadcast channel, IPBroadcast-Delivery specifies the address information for receiving Notification message. In case of delivery over Interaction channel, RequestURL specifies address information for subscribing notification, PollURL specifies address information for polling notification. When the Notification Message resource pointed by this element provides Notification Messages carrying Service Guide update, those SHALL relate to the currently bootstrapped Service Guide. If this element is present, at least one of the atttributes "IPBroadcast-Delivery", "RequestURL", or "PollURL" SHALL be present. Contains the following elements: IPBroadcast-Delivery RequestURL PollURL | |
| IPBroadcast-Delivery | E2 | NM/TM | 0 . . . 1 | Provides IP multicast address and port number for reception of | |

TABLE 1-continued

| Name | Type | Category | Cardinality | Description | Data Type |
|---|---|---|---|---|---|
| | | | | Notification Messages over the broadcast channel. Contains the following attributes: port address | |
| Port | A | NM/TM | 1 | General Notification Message delivery UDP destination port number; delivery over Broadcast Channel. | Unsigned Int |
| Address | A | NM/TM | 1 | General Notification Message delivery IP multicast address; delivery over Broadcast Channel. | string |
| RequestURL | E2 | NM/TM | 0 ... 1 | URL through which the terminal can subscribe to general Notification Messages; delivery over Interaction Channel. | Any URI |
| PollURL | E2 | NM/TM | 0 ... 1 | URL through which the terminal can poll general Notification Messages over Interaction Channel. | Any URI |
| BSMList | E1 | NM/TM | 0 ... 1 | Declaration of the BSM Selectors which can be used in the GroupingCriteria sections defined below. Contains the following element: BSMSelector | |
| BSMSelector | E2 | NM/TM | 1 ... N | Specifies the BSM associated with the fragments in this Service Guide Delivery Unit Allows a terminal to determine whether the SGDU's in this SGDD DescriptorEntry - among the SGDU's that are announced in various DescriptorEntries in various SGDD's - is associated with the terminal's affiliated BSM(s). The terminal's affiliated BSM(s) are represented within terminal as Management Objects with identifier '<X>/BSMSelector/BSM FilterCode' or as codes on the Smartcard as defined by [3GPP | |

TABLE 1-continued

| Name | Type | Category | Cardinality | Description | Data Type |
|------|------|----------|-------------|-------------|-----------|
| | | | | TS 22.022], [3GPP2 C.S0068-0], [3GPP TS 31.102], [3GPP2 C.S0023-C], or [3GPP2 C.S0065-0] . . . For the interpretation of the BSMSelector within the SGDD the following SHALL apply: If the BSMFilter-Code present in this element matches to any of the '<X>BSM-Selector//-BSMFilter-Code' entries within the terminal, or to any of the codes on the Smartcard, i.e. all of the instantiated attributes of BSMFilter-Code have matching instantiated attributes under the '<X>/BSM-FilterCode' or matching codes on the Smartcard, the terminal is able to process, render, interpret and handle the fragments without restrictions. Note that it is considered a match when the instantiated attributes under the BMSFilter-Code matches a subset of the instantiated attributes of '<X>/BSM-Selector/-BSMFilter-Code' or matches a subset of the codes on the SmartCard. However, when the instantiated BSMFilter-Code | |

TABLE 1-continued

| Name | Type | Category | Cardinality | Description | Data Type |
|------|------|----------|-------------|-------------|-----------|
| | | | | represents a superset of attributes of the '<X>/BSM-Selector/-BSMFilter-Code' or a superset of the codes on the Smartcard, it is not considered a match, because not all instantiated attributes under the BSMFilter-Code matches to instantiated attributes of '<X>/BSM-Selector/BSM-Filter-Code' or codes on the Smartcard. If the BSMFilter-Code present in this element does not match to any of the '<X>/BSM-Selector/-BSMFilter-Code' entries within the terminal,, i.e. not all of the instantiated attributes of BSMFilter-Code have matching instantiated attributes under the '<X>/BSM-Selector/-BSMFilter-Code' or codes on the Smartcard, the terminal can render, interpret and handle the fragments according to Roaming-Rules associated with this BSMSelector (identified by the attribute 'id'). In case the terminal does not have these Roaming- | |

TABLE 1-continued

| Name | Type | Category | Cardinality | Description | Data Type |
|---|---|---|---|---|---|
| | | | | Rules the terminal SHALL NOT render the fragments to the user. The terminal MAY acquire the rules by sending a Roaming-RuleRequest to address indicated by attribute "Roaming-RuleRequest Address". In case the terminal has no '<X>/BSMSelector/BSMFilterCode' entries or no codes on the Smartcard, for the interpretation of the BSMSelector within the SGDD the following SHALL apply: The terminal can render, interpret and handle the fragments according to Roaming-Rules associated with this BSMSelector (identified by the attribute 'id'). In case the terminal does not have these Roaming-Rules the terminal SHALL NOT render the fragments to the user. The terminal MAY acquire the rules by sending a RoamingRule Request to address indicated by attribute "roaming-RuleRequest Address". Note: RoamingRule-Request message and associated roaming methods are specified in [BCAST10-Services]. Contains the following attributes: id | |

TABLE 1-continued

| Name | Type | Category | Cardinality | Description | Data Type |
|---|---|---|---|---|---|
| | | | | roamingRule-RequestAddress Contains the following elements: BSMFilterCode Name RoamingRule | |
| Id | A | NM/TM | 1 | Identifier of the BSMSelector. This 'id' is unique within network. | Any URI |
| roamingRuleRequest-Address | A | NO/TM | 0 . . . 1 | Address to which the terminals can send the RoamingRule-Requests to request RoamingRules associated with this BSMSelector (identified with the 'id' attribute). | Any URI |
| BSMFilter-Code | E3 | NM/TM | 0 . . . 1 | The code that specifies this BSMSelector. Contains the following attributes: type serviceProvider-Code corporateCode serviceProvider-Name nonSmartCardCode Contains the following elements: NetworkCode3GPP NetworkCode3GPP2 Note: At most either 'NetworkCode3GPP' or 'NetworkCode3GPP2' SHALL be present. Implementation in XML Schema should use <choice>. | |
| Type | A | NM/TM | 1 | The type of bsmFilterCode. 1 - BSMCode (Smart Card Code) This is used if the determination is made based on the country and operator code in the (U)SIM/(R-)UIM/CSIM 2 - BSMCode (Non Smart Card Code): This is used if the determination is made based on the country and operator code in the terminal Other values are reserved. | Unsigned Byte |
| Service-ProviderCode | A | NO/TM | 0 . . . 1 | Service Provider Code as specified by [3GPP TS 22.022] or [3GPP2 C.S0068-0]. Applicable only when "type" == 1 | Unsigned Byte |

TABLE 1-continued

| Name | Type | Category | Cardinality | Description | Data Type |
|---|---|---|---|---|---|
| corporateCode | A | NO/TM | 0...1 | Corporate Code as specified by [3GPP TS 22.022] or [3GPP2 C.S0068-0]. Applicable only when "type" == 1 | Unsigned Byte |
| Service-ProviderName | A | NO/TM | 0...1 | Service Provider Name (SPN) as specified by [3GPP TS 31.102], [3GPP2 C.S0023-C], or [3GPP2 C.S0065-0]. Applicable only when "type" == 1 | string |
| nonSmartCard Code | A | NO/TM | 0...1 | Value of BSMFilterCode when "type" == 2 | string |
| NetworkCode3 GPP | E4 | NO/TM | 0...1 | IMSI-based Network, Network Subset or SIM/USIM codes as specified by [3GPP TS 22.022]. Applicable only when "type" == 1. Contains the following attributes: MobileCountry-Code mobileNetwork Code networkSubset-Code networkSubset-CodeRangeStart networkSubset-CodeRangeEnd codeRangeStart codeRangeEnd | |
| mobileCountry Code | A | NO/TM | 0...1 | Mobile Country Code (3 digits) as specified by [3GPP TS 22.022]. | string of 3 digits |
| Mobile-NetworkCode | A | NO/TM | 0...1 | Mobile Network Code (2-3 digits) as specified by [3GPP TS 23.003]. | string of 2-3 digits |
| networkSubset Code | A | NO/TM | 0...1 | Network Subset Code (2 digits) as specified by [3GPP TS 22.022]. | string of 2 digits |
| NetworkSubset CodeRange-Start | A | NO/TM | 0...1 | Instead of providing an explicit code in attribute 'networkSubset-Code', the network MAY instead provide a continuous range of codes. In such a case the network SHALL provide the smallest code for the terminal to accept in this attribute, the greatest code in the attribute 'networkSubset CodeRange End' and | string of 2 digits |

TABLE 1-continued

| Name | Type | Category | Cardinality | Description | Data Type |
|---|---|---|---|---|---|
| | | | | SHALL not instantiate attribute 'networkSubsetCode'. The terminal SHALL interpret all the code values between the smallest and the greatest code as values to be accepted. | |
| networkSubsetCodeRangeEnd | A | NO/TM | 0 . . . 1 | This attribute signals the end of the range of Network Subset Codes as specified above. | string of 2 digits |
| codeRangeStart | A | NO/TM | 0 . . . 1 | This attribute signals the lowest code value from a continuous range of one or more codes, which is used by the BCAST Terminal to determine whether a match exists with the local SIM/USIM code. The Terminal SHALL accept all code values between (and inclusive of) the lowest and highest code value for matching against the local SIM/USIM code. | string of 8 digits |
| codeRangeEnd | A | NO/TM | 0 . . . 1 | This attribute signals the highest code value for the BCAST Terminal to be considered valid for matching against the local SIM/USIM code, as described above. | string of 8 digits |
| NetworkCode3GPP2 | E4 | NO/TM | 0 . . . 1 | IMSI and/or NAI based Network or (R-)UIM/CSIM codes as specified by [3GPP2 C.S0068-0]. Applicable only when "type" == 1. Contains the following attributes: MobileCountryCode mobileNetworkCode iRMBasedMIN hRPDRealm ruimCSIMCodeRangeStart ruimCSIMCodeRangeEnd | |
| mobileCountryCode | A | NO/TM | 0 . . . 1 | Mobile Country Code (3 digits) as specified for Network Type 1 by [3GPP2 C.S0068-0]. | string of 3 digits |

TABLE 1-continued

| Name | Type | Category | Cardinality | Description | Data Type |
|---|---|---|---|---|---|
| Mobile-NetworkCode | A | NO/TM | 0 ... 1 | Mobile Network Code (2-3 digits) as specified for Network Type 1 by [3GPP2 C.S0068-0]. | string of 2-3 digits |
| iRMBasedMIN | A | NO/TM | 0 ... 1 | First 4 digits of IRM-based MIN as specified for Network Type 2 by [3GPP2 C.S0068-0]. | string of 4 digits |
| hRPDRealm | A | NO/TM | 0 ... 1 | REALM code of the relevant HRPD network as specified by [3GPP2 C.S0068-0]. | integer |
| RuimCSIM-CodeRange-Start | A | NO/TM | 0 ... 1 | (R-)UIM or CSIM code, as specified in [3GPP2 C.S0023-C], [3GPP2 C.S0065-0] or [3GPP2 C.S0068-0]. This attribute signals the lowest code value from a continuous range of one or more codes, which is used by the BCAST Terminal to determine whether a match exists with the local (R-)UIM/CSIM code. The Terminal SHALL accept all code values between (and inclusive of) the lowest and highest code value for matching against the local (R-)UIM/CSIM code. | string |
| RuimCSIM-CodeRangeEnd | A | NO/TM | 0 ... 1 | (R-)UIM or CSIM code, as specified in [3GPP2 C.S0023-C], [3GPP2 C.S0065-0] or [3GPP2 C.S0068-0]. This attribute signals the lowest code value from a continuous range of one or more codes, which is used by the BCAST Terminal to determine whether a match exists with the local (R-)UIM/CSIM code. The Terminal SHALL accept all code values between (and inclusive of) the lowest and highest code value for matching against the local (R-)UIM/CSIM code. | string |
| Name | E3 | NM/TM | 1 ... N | Provides a user readable name for | string |

TABLE 1-continued

| Name | Type | Category | Cardinality | Description | Data Type |
|---|---|---|---|---|---|
| | | | | the BSM_Selector, possibly in multiple languages. The language is expressed using built-in XML attribute xml:lang with this element. This element can be used to provide information to the user so he can select the BSMSelector the terminal has to use. | |
| RoamingRule | E3 | NO/TM | 0 ... N | Specifies a Roaming Rule associated with BSMSelector. Contains the following attributes: allowAll denyAll Contains the following elements: TimeFrame Allow-PurchaseItem Allow-PurchaseData Allow-Service Allow-Content Deny-PurchaseItem Deny-PurchaseData DenyService DenyContent The terminal SHALL interpret RoamingRule for each fragment so that in case 'allow' rule and 'deny' rule apply simultaneously, the 'deny' rule takes precedence. | |
| allowAll | A | O | 0 ... 1 | Rule that, when set to "true", allows the Terminal to use all the fragments associated with BSMFilterCode associated with these RoamingRules. The default value of this attribute is "false". This attribute SHALL not be present if attribute 'denyAll' is present. | boolean |
| denyAll | A | O | 0 ... 1 | Rule that, when set to "true", prohibits the Terminal to use any the fragments associated with BSMFilterCode associated with these RoamingRules. The default value | boolean |

TABLE 1-continued

| Name | Type | Category | Cardinality | Description | Data Type |
|---|---|---|---|---|---|
| | | | | of this attribute "false". This attribute SHALL not be present if attribute 'allowAll' is present. | |
| TimeFrame | E4 | O | 0 . . . N | Rule that defines the time frame(s) this RoamingRule is applies to. Contains the following attributes: startTime endTime | |
| startTime | A | O | 0 . . . 1 | Start of the time frame. If not given, the time frame is assumed to have started at some time in the past. This field is expressed as the first 32 bits integer part of NTP time stamps. | unsigned Int |
| endTime | A | O | 0 . . . 1 | End of the time frame. If not given, the time frame is assumed to end at some time in the future. This field is expressed as the first 32 bits integer part of NTP time stamps. | unsigned Int |
| Allow PurchaseItem | E4 | O | 0 . . . 1 | Rule that allows the Terminal to use the listed PurchaseItems. Contains the following element: Id | |
| Id | E5 | M | 1 . . . N | This element contains value that represents GlobalPurchaseItemID that is allowed to be interpreted, rendered and accessed. | Any URI |
| Allow PurchaseData | E4 | O | 0 . . . 1 | Rule that allows the Terminal to use the listed PurchaseData items. Contains the following element: Id | |
| Id | E5 | M | 1 . . . N | This element contains value that represents PurchaseData fragment ID that is allowed to be interpreted, rendered and accessed. | Any URI |
| Allow Service | E4 | O | 0 . . . 1 | Rule that allows the Terminal to use the fragments corresponding to listed GlobalServiceIDs. Contains the following element: Id | |

TABLE 1-continued

| Name | Type | Category | Cardinality | Description | Data Type |
|---|---|---|---|---|---|
| Id | E5 | M | 1 ... N | This element contains value that represents GlobalServiceID. Fragments associated with this GlobalServiceID are allowed to be interpreted, rendered and accessed. | Any URI |
| Allow Content | E4 | O | 0 ... 1 | Rule that allows the Terminal to use the fragments corresponding to listed ContentIDs. Contains the following element: Id | |
| Id | E5 | M | 1 ... N | This element contains value that represents GlobalContentID. Fragments associated with this GlobalContentID are allowed to be interpreted, rendered and accessed. | Any URI |
| Deny PurchaseItem | E4 | O | 0 ... 1 | Rule that denies the Terminal to use the listed PurchaseItems. Contains the following element: Id | |
| Id | E5 | M | 1 ... N | This element contains value that represents GlobalPurchaseItemID that is denied to be interpreted, rendered and accessed . . . | Any URI |
| Deny PurchaseData | E4 | O | 0 ... 1 | Rule that denies the Terminal to use the listed PurchaseData items. Contains the following element: Id | |
| Id | E5 | M | 1 ... N | This element contains value that represents PurchaseData fragment ID that is denied to be interpreted, rendered and accessed . . . | Any URI |
| Deny Service | E4 | O | 0 ... 1 | Rule that denies the Terminal to use the fragments corresponding to listed GlobalServiceIDs. Contains the following element: Id | |
| Id | E5 | M | 1 ... N | This element contains value that represents GlobalServiceID. Fragments associated with this GlobalServiceID are denied to be | Any URI |

TABLE 1-continued

| Name | Type | Category | Cardinality | Description | Data Type |
|---|---|---|---|---|---|
| | | | | interpreted, rendered and accessed. | |
| Deny Content | E4 | O | 0 ... 1 | Rule that denies the Terminal to use the fragments corresponding to listed ContentIDs. Contains the following element: Id | |
| Id | E5 | M | 1 ... N | This element contains value that represents GlobalContentID. Fragments associated with this GlobalContentID are denied to be interpreted, rendered and accessed. | Any URI |
| DescriptorEntry | E1 | NM/TM | 1 ... N | An entry in the Service Guide Delivery Descriptor. Contains the following elements: GroupingCriteria, Transport, AlternativeAccessURL, ServiceGuide-DeliveryUnit | |
| GroupingCriteria | E2 | NM/TM | 0 ... 1 | Specifies the criteria for grouping Service Guide fragments in this Service Guide DescriptorEntry. If several criteria for grouping are present at the same time, all those grouping criteria apply to the set of Service Guide fragments in this Service Guide DescriptorEntry. Please note the same fragment may be declared in multiple DescriptorEntry of the same SGDD in case this fragment can meet multiple grouping criteria. Contains the following elements: TimeGroupingCriteria GenreGroupingCriteria BSMSelector ServiceCriteria The 'GroupingCriteria' MAY be present as sub-element of 'DescriptorEntry' covering all fragments in this DescriptorEntry. Further, the 'GroupingCriteria' MAY be present as sub-element of 'Fragment' assigning the | |

TABLE 1-continued

| Name | Type | Category | Cardinality | Description | Data Type |
|---|---|---|---|---|---|
| | | | | criteria to a particular fragment. When the 'GroupingCriteria' is present on both of the mentioned levels, the terminal SHALL consider the fragment-level 'GroupingCriteria' providing additional (not overriding) grouping criteria for the fragment. | |
| TimeGrouping Criteria | E3 | NM/ TM | 0 . . . 1 | Specifies the period of time this DescriptorEntry describes. (For example: declares a certain subgroup of valid Service Guide fragments for next 2 hours). This field contains the 32 bits integer part of an NTP time stamp. Contains the following attributes: startTime, endTime A fragment matches the TimeGrouping-Criteria if it describes information related to content or interactivity that can be distributed, consumed, or activated during a time interval that is not disjoint with the time interval specified by startTime/endTime. | |
| startTime | A | NM/ TM | 1 | Start of the time period of TimeGrouping-Criteria. This field contains the 32 bits integer part of an NTP time stamp. | unsigned Int |
| endTime | A | NM/ TM | 1 | End of the time period of TimeGrouping-Criteria. This field contains the 32 bits integer part of an NTP time stamp. | unsigned Int |
| GenreGroupingCriteria | E3 | NM/ TM | 0 . . . 1 | Specifies the classification of the services/content associated with the fragments in this Service Guide Delivery Unit (e.g. comedy, action, drama). The OMA BCAST Service Guide allows describing the format of the Genre element in the Service Guide in two ways: | string |

TABLE 1-continued

| Name | Type | Category | Cardinality | Description | Data Type |
|------|------|----------|-------------|-------------|-----------|
| | | | | The first way is to use a free string The second way is to use the "href" attributes of the Genre element to convey the information in the form of a controlled vocabulary (classification scheme as defined in [TVA-Metadata] or classification list as defined in [MIGFG]). The built-in XML attribute xml:lang MAY be used with this element to express the language. The Network MAY instantiate several different sets of 'Genre' element, using it as a free string or with a 'href' attribute. The Network SHALL ensure the different sets have equivalent and non-conflicting meaning, and the terminal SHALL select one of the sets to interpret for the end-user. Contains the following attributes: type href | |
| Type | A | NO/TO | 0 . . . 1 | This attribute signals the level of this 'Genre' element. The following values are allowed: "main" "secondary" "other" | string |
| Href | A | NO/TO | 0 . . . 1 | This attribute signals the controlled vocabulary used for this 'Genre' element. If this attribute is supported, the following applies to the support and use of classification schemes according to [TVA-Metadata]: for values of the 'type' attribute | Any URI |

TABLE 1-continued

| Name | Type | Category | Cardinality | Description | Data Type |
|------|------|----------|-------------|-------------|-----------|
| | | | | equal to "main" or "secondary", the terminal MAY support levels 1-4 of the TV Anytime ContentCS classification scheme identified by the classificationSchemeURI urn:tva:metadata:cs:ContentCS:2005 as defined in Annex A.8 of [TVA-Metadata] for a value of the 'type' attribute equal to "other", the terminal MAY support levels 1-3 of the TV Anytime IntendedAudienceCS classification scheme identified by the classificationSchemeURI urn:tva:metadata:cs:IntendedAudience-CS:2005 as defined in Annex A.11 of [TVA-Metadata]. When the IntendedAudienceCS is provided simultaneously with an instantiation of the 'TargetUserProfile', the two SHALL have equivalent meaning. The network SHALL use the following URI syntax to signal terms from classification schemes: <classification-SchemeURI> ":" <termID> If this attribute is instantiated by the network, the element 'Genre' | |

TABLE 1-continued

| Name | Type | Category | Cardinality | Description | Data Type |
|---|---|---|---|---|---|
| | | | | SHALL be an empty string and the xml:lang attribute SHALL NOT be used. If this attribute is supported, the following applies to the support and use of the classification from [MIGFG]: This classification SHALL be signalled with the URI "http://www.loc.gov/rr/mopic/miggen.html" The string value carried in the 'Genre' element SHALL be used to convey the actual value of the classification as given in [MIGFG] The Network MAY use the values "main" and "secondary" of the 'type' attribute so as to provide an ordering of two classifications applying to the same Service. Other Classification Schemes MAY be signalled with the 'href' attribute, however how they are used is out of scope of this specification. If this attribute is not instantiated, the 'Genre' element SHALL be a free string. | |
| BSMSelector | E3 | NM/TM | 0 . . . N | Specifies the BSM associated with the fragments in this Service Guide Delivery Unit by referencing a BSMSelector structure declared above. Contains the following attribute: idRef | |
| idRef | A | NM/TM | 1 | Reference to the identifier of the | Any URI |

TABLE 1-continued

| Name | Type | Category | Cardinality | Description | Data Type |
|---|---|---|---|---|---|
| | | | | BSMSelector declared within the 'BSMList' above. | |
| ServiceCriteria | E3 | NM/TM | 0...1 | Allows to group fragments by service. The value of this field is the fragment ID of the 'Service' fragment related to that service. | Any URI |
| Transport | E2 | NM/TM | 0...1 | The pointer to the transport session delivering the Service Guide fragments within Service Guide Delivery Units announced in this DescriptorEntry. Contains the following attributes: ipAddress, port, srcIpAddress, transmissionSessionID, hasFDT | |
| ipAddress | A | NM/TM | 1 | Destination IP address of the target delivery session | string |
| Port | A | NM/TM | 1 | Destination port of target delivery session | unsigned Short |
| srcIpAddress | A | NM/TM | 0...1 | Source IP address of the delivery session In case source specific multicast scheme is applied in the transmission, then the 'srcIpAddress' attribute SHALL have as its value the IP address found in the IP-packets belonging to the IP-stream in question. In case this attribute is omitted, there SHALL only be one source IP address from which the file delivery session originates which is defined by the combination of destination IP address, port and transmission session ID given. | string |
| transmissionSessionID | A | NM/TM | 1 | This is the Transmission Session Identifier (TSI) of the session at ALC/LCT level | unsigned Short |
| hasFDT | A | NO/TM | 0...1 | If FDT is transmitted in the transport session delivering the Service Guide fragments, this attribute SHALL be set to "true". | boolean |

TABLE 1-continued

| Name | Type | Category | Cardinality | Description | Data Type |
|------|------|----------|-------------|-------------|-----------|
| | | | | Otherwise this attribute SHALL be set to "false". The default value of this attribute is "true". If this element is set to "false", the FEC parameters related to transport objects delivering SGDUs in the transport session SHALL be signalled using EXT_FTI [RFC 3926]. the optional compression of SGDUs SHALL be signalled using EXT_CENC [RFC 3926]. Note that EXT_CENC was originally defined in [RFC 3926] for signaling the encoding of the FDT, but is assigned to a different usage in this specification for the specific case of SGDU delivery directly using ALC. | |
| Alternative-AccessURL | E2 | NM/TM | 0 . . . N | Declares the alternative URL for retrieving the Service Guide fragments, declared in the parent 'DescriptorEntry' element, via the interaction channel. In addition, fragments not declared in the | Any URI |

TABLE 1-continued

| Name | Type | Category | Cardinality | Description | Data Type |
|---|---|---|---|---|---|
| | | | | parent 'DescriptorEntry' MAY also be available. Terminal MAY check the availability of undeclared fragments by issuing an unspecific Service Guide request against the 'AlternativeAccess URL', as specified in section 5.4.3.2 of the present document. If there are multiple instances of AlternativeAccess-URL signalled, the terminal SHALL randomly select one of them to use. Note: usage of this element is specified in section 5.4.1.5.4 of the present document. | |
| ServiceGuide-DeliveryUnit | E2 | NM/TM | 1 . . . N | A group of fragments. Contains the following attributes: transportObjectID, versionIDLength, contentLocation, validFrom, validTo Contains the following element: Fragment | |
| Transport-ObjectID | A | NM/TM | 0 . . . 1 | The transport object ID of the Service Guide Delivery Unit carrying the declared fragments within this group. If 'hasFDT' is assigned with value 'true', then the value of 'transportObjectID' SHALL match the value of the TOI paired in the FDT instance with the 'Content-Location' having as its value the value of the 'contentLocation' attribute below. If and only if element E2 'Transport' is instantiated, SHALL this attribute be instantiated. | Positive-Integer |
| versionID-Length | A | NO/TO | 0 . . . 1 | Indicates the number of least significant bits representing the version ID in the transportObjectID, when Split TOI is | unsigned Long |

TABLE 1-continued

| Name | Type | Category | Cardinality | Description | Data Type |
|---|---|---|---|---|---|
| | | | | used. If this element is omitted, the terminal assumes Split-TOI is not used. | |
| Content-Location | A | NM/TM | 0 . . . 1 | This is the location of the Service Guide Delivery Unit. It corresponds to the 'Content-Location' attribute in the FDT. If and only if element E2 'Transport' is instantiated, SHALL this attribute be instantiated. | Any URI |
| validFrom | A | NM/TM | 0 . . . 1 | The first moment of time this group of Service Guide fragments is valid. This field contains the 32 bits integer part of an NTP time stamp. Note: If this attribute is not present, 'validFrom' attribute MUST be present in the 'Fragment' sub-element. | unsigned Int |
| validTo | A | NM/TM | 0 . . . 1 | The last moment of time this group of Service Guide fragments is valid. This field contains the 32 bits integer part of an NTP time stamp. Note: If this attribute is not present, 'validTo' attribute MUST be present in the 'Fragment' sub-element. | unsigned Int |
| Fragment | E3 | NM/TM | 1 . . . N | Declaration of Service Guide fragment. If the fragment is available over the broadcast channel it MUST be present here. If the fragment is available over the interaction channel it MAY be present here. Contains the following attributes: transportID, id version validFrom validTo fragmentEncoding fragmentType Contains the following element: GroupingCriteria | |

TABLE 1-continued

| Name | Type | Category | Cardinality | Description | Data Type |
|---|---|---|---|---|---|
| transportID | A | NM/TM | 0...1 | The identifier of the announced Service Guide fragment to be used in the Service Guide Delivery Unit header. Note: if the SG is delivered over the broadcast channel only, this element MUST be present | unsigned Int |
| Id | A | NM/TM | 1 | The identifier of the announced Service Guide fragment. | Any URI |
| Version | A | NM/TM | 1 | The version of the announced Service Guide fragment. Note: The scope of the version is limited to the given transport session. The value of version turn over from 2^32 − 1 to 0. | unsigned Int |
| validFrom | A | NM/TM | 0...1 | The first moment when this fragment is valid. If not given, the validity is assumed to have started at some time in the past. This field contains the 32 bits integer part of an NTP time stamp. Note: If this attribute is present and 'validFrom' attribute of 'ServiceGuideDelivery-Unit' is also present, the value of this attribute overrides the value of 'ServiceGuideDelivery-Unit' attribute 'validFrom'. | unsigned Int |
| validTo | A | NM/TM | 0...1 | The last moment when this fragment is valid. If not given, the validity is assumed to end in undefined time in the future. This field contains the 32 bits integer part of an NTP time stamp. Note: If this attribute is present and 'validTo' attribute of 'ServiceGuide-DeliveryUnit' is also present, the value of this attribute overrides the value of 'ServiceGuide-DeliveryUnit' attribute 'validTo'. | unsigned Int |
| Fragment-Encoding | A | NM/TM | 1 | Signals the encoding of a Service Guide fragment, with the | unsigned Byte |

TABLE 1-continued

| Name | Type | Category | Cardinality | Description | Data Type |
|---|---|---|---|---|---|
| | | | | following values:<br>0 - XML encoded OMA BCAST Service Guide fragment<br>1 - SDP fragment<br>2 - MBMS User Service Description as specified in [26.346] (see 5.1.2.4, SessionDescription Reference)<br>3 - XML encoded Associated Delivery Procedure as specified in [BCAST10-Distribution] section 5.3.4.<br>4-127 - reserved for future BCAST extensions<br>128-255 - available for proprietary extensions | |
| fragmentType | A | NM/TM | 0 . . . 1 | This field signals the type of an XML encoded BCAST Service Guide fragment, with the following values:<br>0 - unspecified<br>1 - 'Service' Fragment<br>2 - 'Content' fragment<br>3 - 'Schedule' Fragment<br>4 - 'Access' Fragment<br>5 - 'PurchaseItem' Fragment<br>6 - 'PurchaseData' Fragment<br>7- 'PurchaseChannel' Fragment<br>8 - 'PreviewData' Fragment<br>9 - 'InteractivityData' Fragment<br>10-127 - reserved for BCAST extensions<br>128-255 - available for proprietary extensions<br>This attribute SHALL be present in case 'fragmentEncoding' = 0.<br>Default: 0 | unsigned Byte |
| GroupingCriteria | E4 | NM/TM | 0 . . . 1 | Specifies the criteria for grouping this Service Guide fragment.<br>If several criteria for grouping are present at the same time, all those grouping criteria apply to this fragment.<br>Contains the | |

TABLE 1-continued

| Name | Type | Category | Cardinality | Description | Data Type |
|---|---|---|---|---|---|
| | | | | following elements: TimeGroupingCriteria BSMSelector The 'GroupingCriteria' MAY be present as sub-element of 'DescriptorEntry' covering all fragments in this DescriptorEntry. Further, the 'GroupingCriteria' MAY be present as sub-element of 'Fragment' assigning the criteria to a particular fragment. When the 'GroupingCriteria' is present on both of the mentioned levels, the terminal SHALL consider the fragment-level 'GroupingCriteria' providing additional (not overriding) grouping criteria for the fragment. | |
| TimeGrouping Criteria | E5 | NM/ TM | 0 . . . 1 | Specifies the period of time as a grouping criteria for the fragment. (For example: declares a certain subgroup of valid Service Guide fragments for next 2 hours). This field contains the 32 bits integer part of an NTP time stamp. Contains the following attributes: startTime endTime A fragment matches the TimeGrouping- Criteria if it describes information related to content or interactivity that can be distributed, consumed or activated during a time interval that is not disjoint with the time interval specified by startTime/endTime. If a 'TimeGrouping- Criteria' element exists at DescriptorEntry level which is applicable to this fragment, the time interval defined here at 'Fragment' level MUST NOT exceed the time | |

TABLE 1-continued

| Name | Type | Category | Cardinality | Description | Data Type |
|---|---|---|---|---|---|
| | | | | interval defined at 'DescriptorEntry' level. | |
| startTime | A | NM/TM | 1 | Start of the time period of TimeGroupingCriteria. This field contains the 32 bits integer part of an NTP time stamp . . . | unsigned Int |
| endTime | A | NM/TM | 1 | End of the time period of TimeGroupingCriteria. This field contains the 32 bits integer part of an NTP time stamp. Note: this is different than fragment validity time. | unsigned Int |
| BSMSelector | E5 | NM/TM | 0 . . . N | Specifies the BSM associated with this fragment by referencing a BSMSelector structure declared above. Contains the following attribute: idRef | |
| idRef | A | NM/TM | 1 | Reference to the BSMSelector declared within the BSMList structure above. | Any URI |
| PrivateExt | E1 | NO/TO | 0 . . . 1 | An element serving as a container for proprietary or application-specific extensions. | |
| <proprietary elements> | E2 | NO/TO | 0 . . . N | Proprietary or application-specific elements that are not defined in this specification. These elements may further contain sub-elements or attributes. | |

Table 1 shows the descriptions of elements and attributes constituting the Service Guide Delivery Descriptor fragment 201. The Service Guide Delivery Descriptor fragment 201 is reflected in eXtensible Markup Language (XML) schema.

The Service Guide Delivery Descriptor fragment 201 is shown in the form of a table for simplicity purposes, and each item is defined as described in Table 1.

The actual data is provided in XML format according to the SGDD fragment 201. The information related to the service guide can be provided in various data formats, such as binary, where the elements and attributes set to corresponding values, depending on the broadcast system.

Referring again to FIG. 3, the terminal 105 acquires transport information about a Service Guide Delivery Unit (SGDU) 312 containing fragment information from a DescriptorEntry of the SGDD fragment received on the SG Announcement Channel 300.

As shown in Table 1, the DescriptorEntry 302, which provides the grouping information of a Service Guide includes the "GroupingCriteria", "ServiceGuideDeliveryUnit", "Transport", and AlternativeAccessURI". The transport-related channel information is provided by the "Transport" or "AlternativeAccessURI", and the actual value of the corresponding channel is provided by "ServiceGuideDeliveryUnit". Also, upper layer group information about the SGDU 312, such as "Service" and "Genre", can be provided by "GroupingCriteria". The terminal 105 can receive and present all of the SGDUs 312 to the user according to the corresponding group information.

Once the transport information is acquired, the terminal 105 accesses all of the Delivery Channels acquired from a DescriptorEntry 302 in an SGDD 301 on an SG Delivery Channel 310 to receive the actual SGDU 312. The SG Delivery Channels can be identified using the "GroupingCriteria". In the case of time grouping, the SGDU can be transported with a time-based transport channel such as an Hourly SG Channel 311 and a Daily SG Channel. Accordingly, the terminal 105 can selectively access the channels and receive all the SGDUs existing on the corresponding channels. Once the entire SGDU is completely received on the SG Delivery Channels 310, the terminal 105 checks all the fragments contained in the SGDUs received on the SG Delivery Channels 310 and assembles the fragments to display an actual full service guide 320 on the screen which can be subdivided on an hourly basis 321.

In the conventional mobile broadcast system, the service guide is formatted and transmitted such that only configured terminals receive the broadcast signals of the corresponding broadcast system. For example, the service guide information transmitted by a DVB-H system can only be received by terminals configured to receive the DVB-H broadcast.

The service providers intend to provide bundled and integrated services using various transmission systems as well as various broadcast systems in accordance with service convergence, which is referred to as multiplay services. The broadcast service providers began providing broadcast services on IP networks as well as mobile broadcast services such as DVB-H. However, the conventional service guide provision methods are designed in system-specific manner such that it only provides a multiplay service subscriber with information on the multiple services provided by the multiplay service provider.

SUMMARY OF THE INVENTION

The present invention has been made to address at least the above problems and/or disadvantages and to provide at least the advantages described below. Accordingly, an aspect of the present invention provides a service guide transmission/reception method and apparatus for a multiplay service that is capable of providing users with a service guide supporting multiplay service guide.

According to one aspect of the present invention, a service guide reception method of a terminal is provided. Service guide delivery information is received. Device class grouping information is extracted from the service guide delivery information. A Service Guide Data Unit (SGDU) containing service guide information required for composing a service guide matched to the terminal is received. The service guide composed using the service guide information received by means of the SGDU is displayed.

According to another embodiment of the present invention, a service guide transmission method is provided. Service guide fragments that constitute a service guide for all terminal classes supported by a service provider is created. Device class grouping information reflecting the service guide fragments is created. Service guide delivery information including the device class grouping information is generated. The service guide delivery information is transmitted through a service guide announcement channel.

According to an additional embodiment of the present invention, a service guide reception system is provided. The system includes a terminal for receiving service guide delivery information, extracting device class grouping information from the service guide delivery information, receiving a Service Guide Data Unit (SGDU) containing service guide information required for composing a service guide matched to the terminal, and displaying the service guide composed using the service guide information received by means of the SGDU.

According to a further embodiment of the present invention, a service guide transmission system is provided. The system includes a broadcast server for creating service guide fragments that constitute a service guide for all terminal classes supported by a service provider, creating device class grouping information reflecting the service guide fragments, generating service guide delivery information including the device class grouping information, and transmitting the service guide delivery information through a service guide announcement channel.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
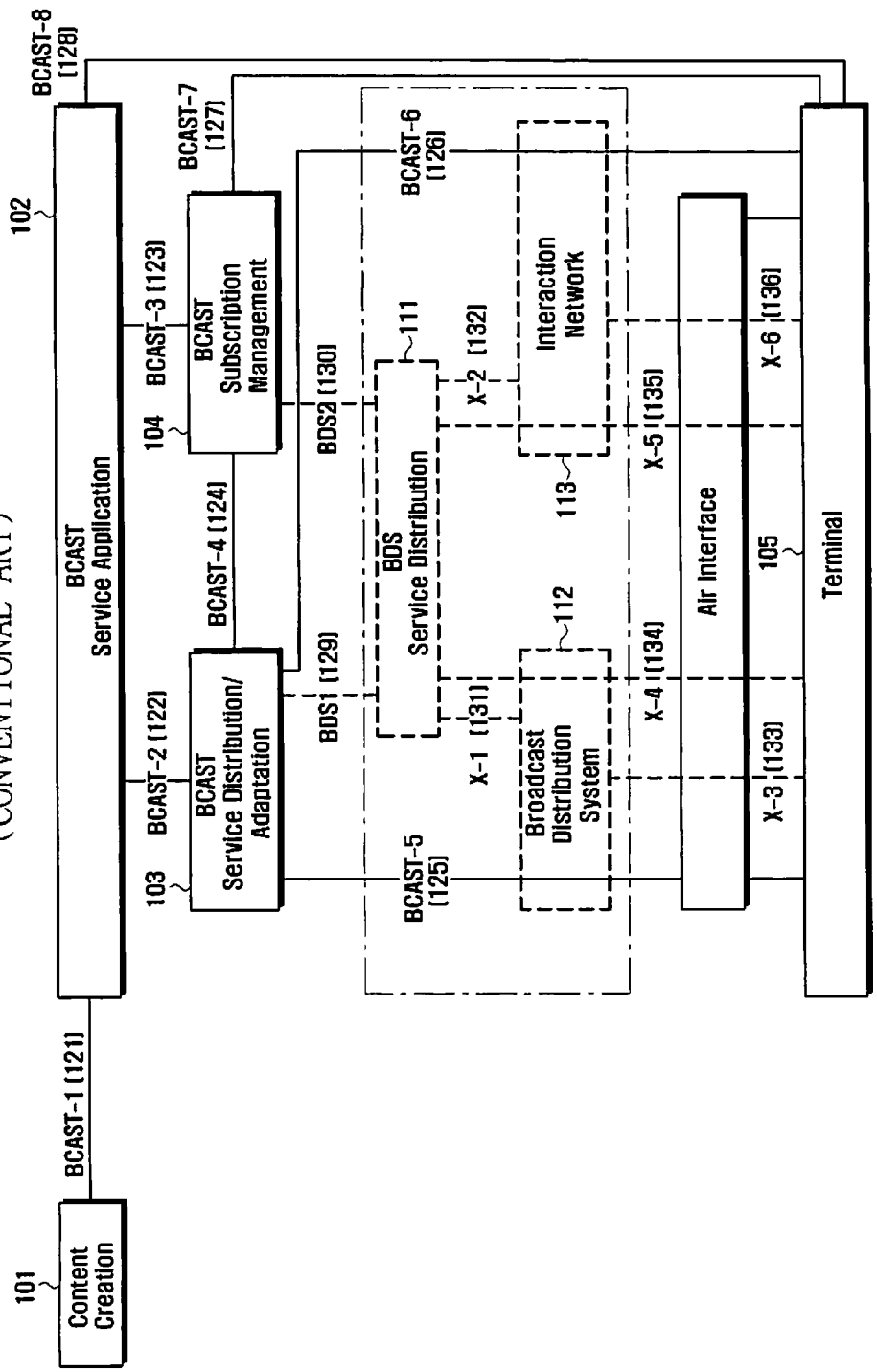
FIG. 1 is a block diagram illustrating logical architecture of a BCAST system specified by OMA BCAST working group in an application layer and a transport layer.
Figure 2:
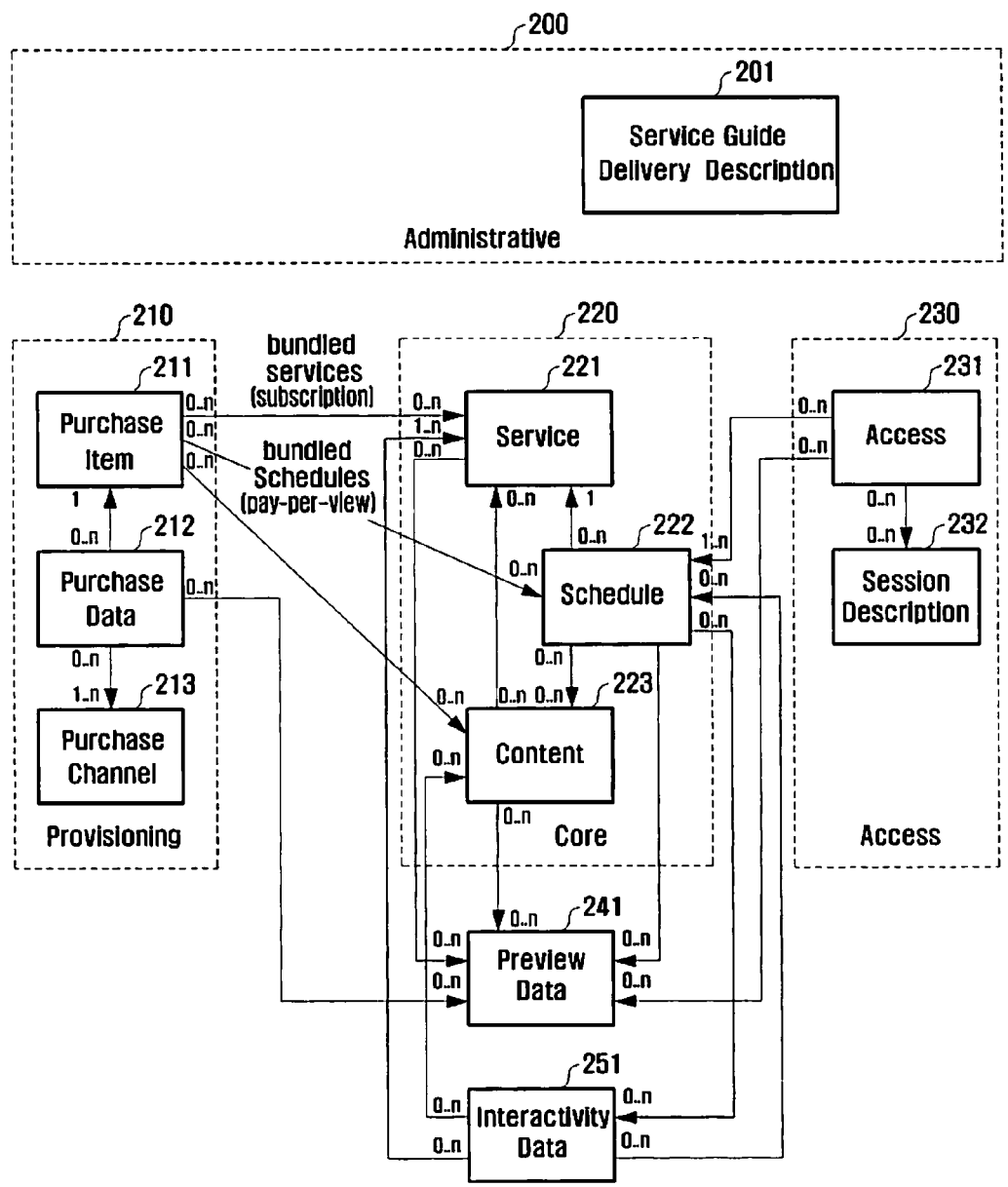
FIG. 2 is a diagram illustrating a structure of a service guide for use in the OMA BCAST system.

Embodiments of the present invention are described in detail with reference to the accompanying drawings in detail. The same or similar components may be designated by the same or similar reference numbers although they are illustrated in different drawings. Detailed descriptions of constructions or processes known in the art may be omitted to avoid obscuring the subject matter of the present invention.

Integrated service guide transmission/reception methods and apparatuses are described according to an embodiment of the present invention. The integrated service guide transmission/reception methods and apparatuses are described using terms of entities defined in the 3GPP standards and OMA BCAST standards for simplicity. However, the present invention is not limited thereto, and can be applied to various communication and broadcast systems having similar technical backgrounds.

Table 2 shows a message schema table according to an embodiment of the present invention.

TABLE 2

| Name | Type | Category | Cardinality | Description | Data type |
|------|------|----------|-------------|-------------|-----------|

As shown in Table 2, the schema table includes "name", "type", "category", "cardinality", "description", and "data type" columns.

The "name" column indicates the name of an element or an attribute. The "type" column indicates an index representing an element or an attribute. An element can be one of E1, E2, E3, and E4. E1 indicates an upper element of an entire message, E2 indicates an element below the E1, E3 indicates an element below E2, and E4 indicates an element below the E3. An attribute is indicated by A. For example, an "A" below E1 means an attribute of element E1. The "category" column is used to indicate whether the element or attribute is mandatory. If an element is mandatory, the category of the element is flagged with an "M". If an element is optional, the category of the element is flagged with an "O". The "cardinality" column indicates a relationship between elements and is set to a value of 0, 0 . . . 1, 1, 0 . . . n, and 1 . . . n. 0 indicates an option, 1 indicates a necessary relationship, and n indicates multiple values. For example, 0 . . . n means that a corresponding element can have no or n values. The "description" column describes the meaning of the corresponding element or attribute, and the "data type" column indicates the data type of the corresponding element or attribute.

In an embodiment of the present invention, a <DeviceClassGroupingCriteria> element is proposed to provide the integrated service guide to the terminal 105. Table shows a part of the ServiceGuideDeliverDescriptor having the <DeviceClassGroupingCriteria>, according to an embodiment of the present invention.

TABLE 3

| Name | Type | Category | Cardinality | Description |
| --- | --- | --- | --- | --- |
| DescriptorEntry | E1 | NM/TM | 1 . . . N | An entry in the Service Guide Delivery Descriptor. Contains the following elements: GroupingCriteria, Transport, AlternativeAccessURL, ServiceGuideDeliveryUnit |
| GroupingCriteria | E2 | NM/TM | 0 . . . 1 | Specifies the criteria for grouping Service Guide fragments in this Service Guide DescriptorEntry. If several criteria for grouping are present at the same time, all those grouping criteria apply to the set of Service Guide fragments in this Service Guide DescriptorEntry. Please note the same fragment may be declared in multiple DescriptorEntry of the same SGDD in case this fragment can meet multiple grouping criteria. Contains the following elements: TimeGroupingCriteria GenreGroupingCriteria BSMSelector ServiceCriteria DeviceClassGroupingCriteria The 'GroupingCriteria' MAY be present as sub-element of 'DescriptorEntry' covering all fragments in this DescriptorEntry. Further, the 'GroupingCriteria' MAY be present as sub-element of 'Fragment' assigning the criteria to a particular fragment. When the 'GroupingCriteria' is present on both of the mentioned levels, the terminal SHALL consider the fragment-level 'GroupingCriteria' providing additional (not overriding) grouping criteria for the fragment. |
| DeviceClassGroupingCriteria | E3 | TM/NM | 0 . . . N | Specifies the criteria for grouping Service Guide fragments based on Device Classes. This element is used provide Service Guides per Device Class to allow service providers to mange multi-play services. Contains the following elements: Class Profile Contains the following attributes: |
| Class | E4 | TM/NM | 1 | Defines the class of device Values are: 0: Any 1: Mobile Terminal without interaction channel 2: Mobile Terminal with interaction channel |

TABLE 3-continued

| Name | Type | Category | Cardinality | Description |
|---|---|---|---|---|
| | | | | 3: STB without interaction channel
4: STB with interaction channel
5: TV without interaction channel
6: TV with interaction channel
7: PC
8: In-car PC
8~255: reserved |
| Profile | E4 | TM/NM | 0 . . . 1 | Defines the profile for detailing the specific requirements for a device class to consume the services announced in the service guide. May use DCAP, UAProf or proprietary methods. |

The terminal 105 forms the service guide using <GroupingCriteria> contained in the SGDD as shown in Table 3.

In order for the service guide of a service provider to support various types of devices, the <DeviceClassGroupingCriteria> is included in the <GroupingCriteria> element.

The <DeviceClassGroupingCriteria> can designate the detailed capabilities and functions of the terminals that are required to receive the service, as well as the types of the terminals.

The <DeviceClassGroupingCriteria> includes a Class element and a Profile element.

The Class element defines the class of a device for which the service guide contained in the <DeviceClassGroupingCriteria> is generated.

The Profile element is used to filter the classes of the terminals defined in the Class element more precisely. The Profile element defines the profile of the terminal. Specifically, the profile element defines capability and preference information including hardware and software information, network information, supportable service information, etc. The Profile element can use the OMA User Agent Profile (UAProf) or Device Capability (DCAP) technology.

Figure 4:
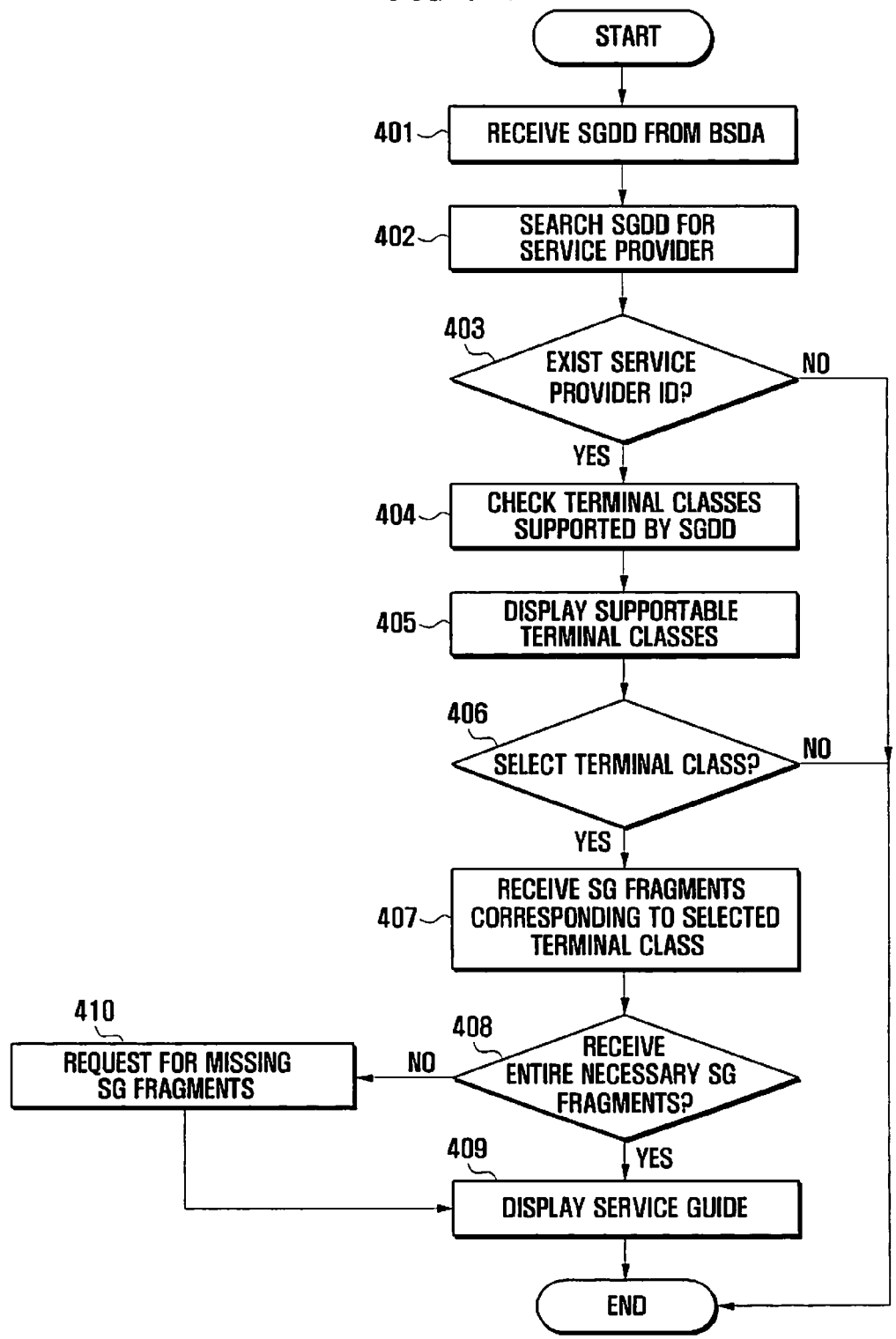
FIG. 4 is a flowchart illustrating a service guide reception method of a terminal for a broadcast service, according to an embodiment of the present invention.

FIG. 4 is a flowchart illustrating a service guide reception method of a terminal for a broadcast service, according to an embodiment of the present invention.

Figure 3:
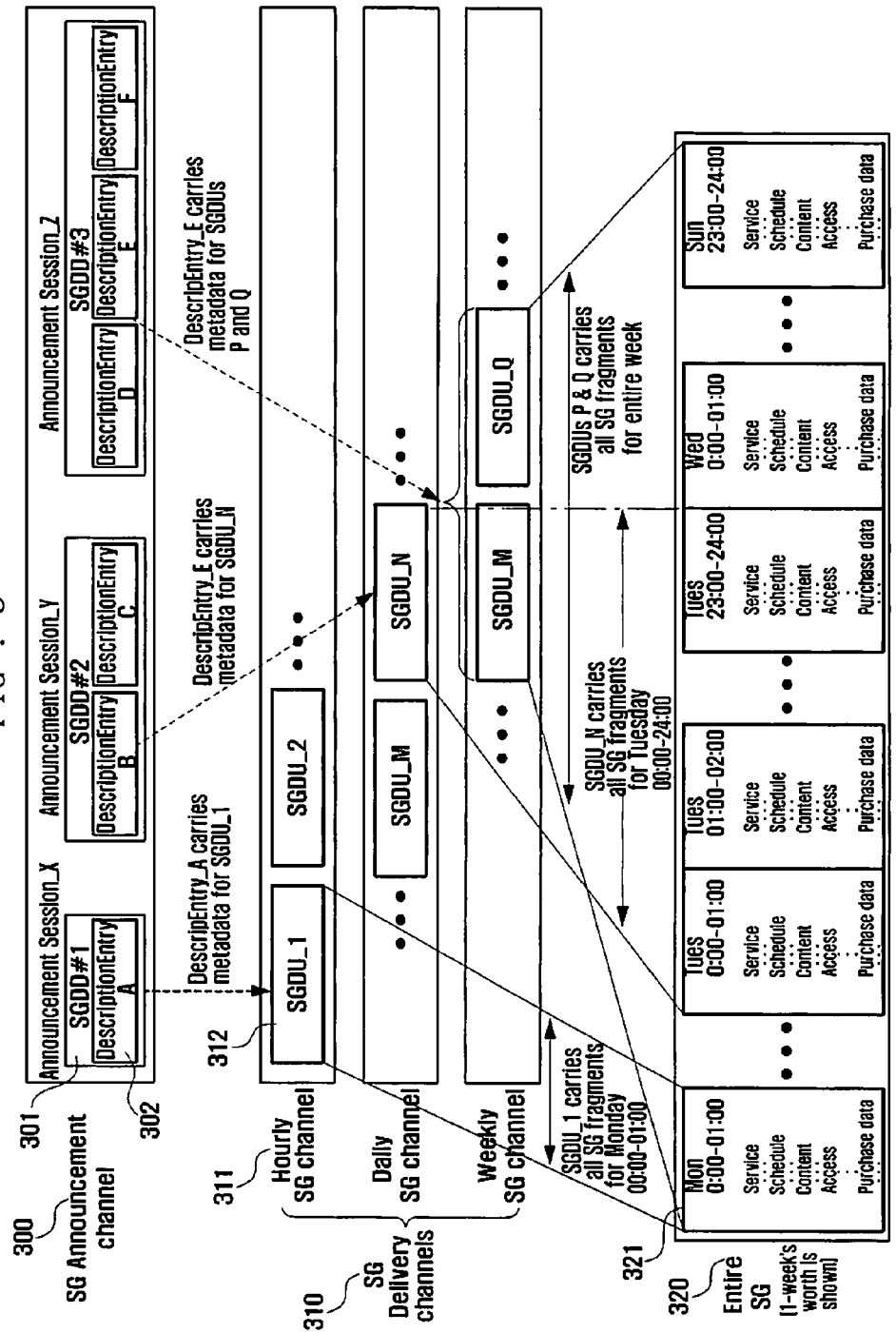
FIG. 3 is a block diagram illustrating a principle of the conventional service guide delivery method.

Referring to Table 3 and FIGS. 3 and 4, the terminal 105 receives an SGDD from the BSDA 103 in step 401.

The terminal 105 can access the SG Announcement Channel 300 to receive the SGDD.

Once the SGDD is received, the terminal 105 acquires a list of service guide fragments required for composing a service guide from the received SGDD. The terminal 105 searches the SGDD for the service provider ID to which the terminal 105 has subscribed in step 402, and determines whether the subscribed service provider ID is present in the SGDD In step 403. In order to determine whether the subscribed service provider ID is present in the SGDD, the terminal 105 searches the <BSMFilterCode> elements for the subscribed service provider's <BSMFilterCode>. In the SGDD, the <BSMFilterCode> can be used as the service provider identifier.

If the service provider ID is not present in the SGDD, the terminal 105 ends the process.

If the service provider ID is present in the SGDD, the terminal 105 extracts a list of classes of terminals supported by the service provider from the <DeviceClassGroupingCriteria> element of the SGDD in step 404.

The terminal 105 displays the list of the terminal classes supported by the service provider to the user in step 405.

The user is able select one of terminal classes from the supportable terminal class list. While displaying the supportable terminal class list, the terminal 105 waits for user input in step 406. If no user selection is input in the predetermined time or a cancel command is input, the terminal 105 ends the process.

If a user input is detected, the terminal 105 checks the terminal class selected by the user and obtains the fragments required for composing the service guide in step 407.

The terminal 105 can be configured to automatically receive the fragments required for composing the service guide based on a default value of the <DeviceClassGroupingCriteria>. In this case, steps 405 and 406 are omitted.

When the service provider is a multiplay service provider, more than one class can be supported. The user can access the multiplay service using different class terminals. In order to search for the services supported by different class terminals, the user obtains an integrated service guide for multiplay service by selecting intended terminal classes on a multiplay service-enabled terminal.

If the user selects a terminal class using the <DeviceClassGroupingCriteria> at step 406, the terminal 105 obtains the list of the service guide fragments required for composing the service guide corresponding to the selected terminal class in step 407. The service guide fragments can be obtained by receiving the SGDUs containing the service guide fragments. Prior to receiving the SGDU, other procedures, specified in the OMA BCAST standard, for processing the SGDD can be performed.

The terminal 105 determines whether all SGDUs containing the service guide fragments required for composing the service guide are completely received in step 408.

If all of the SGDUs containing the service guide fragments required for composing the service guide are completely received, the terminal 105 displays the service guide to the user in step 409.

When the transmission system of a service provide for a specific terminal class lacks capacity, some service guide fragments cannot be provided. If all of the SGDUs containing the service guide fragments required for composing the service guide are not received at step 408, the terminal 105 requests the BSDA 103 for the missing SGDUs using a Point to Point (P2P) method in step 410. Once all of the SGDUs required for the service guide are received, the terminal displays the service guide to the user in step 409.

Figure 5:
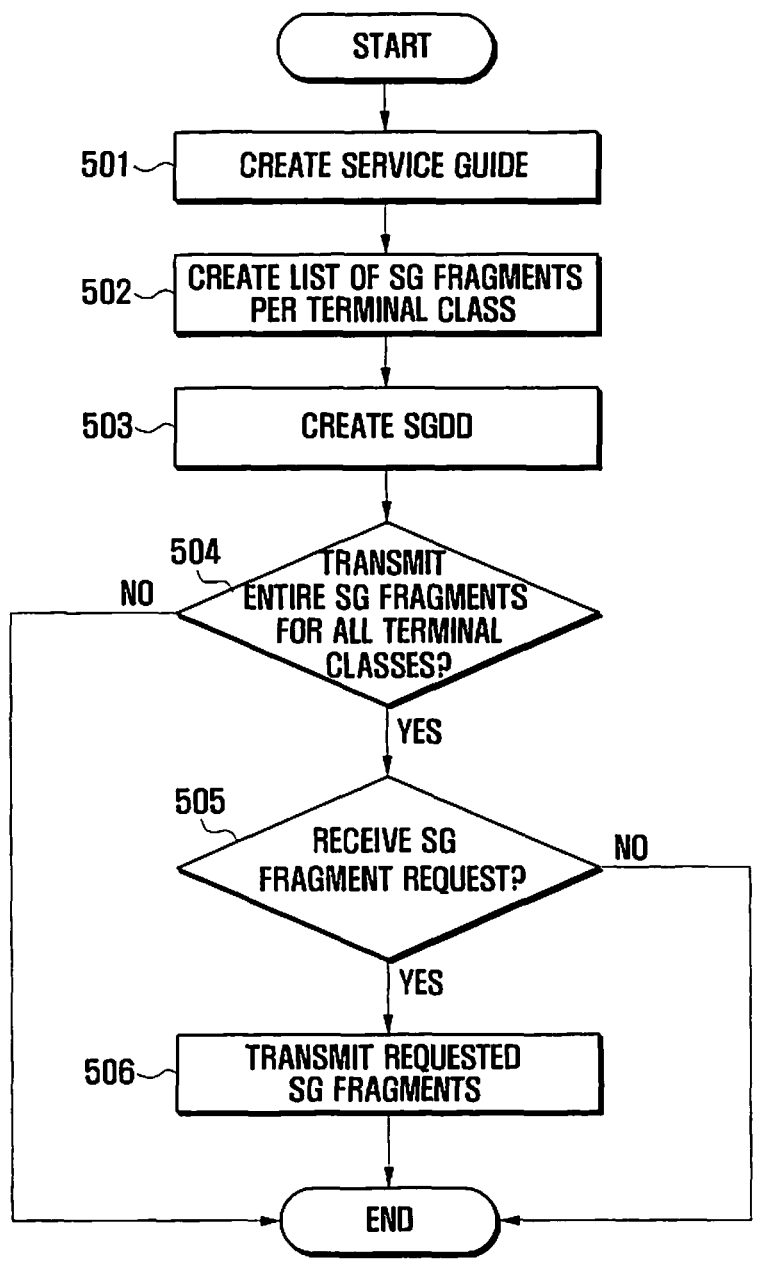
FIG. 5 is a flowchart illustrating a service guide transmission method of a BSDA for a broadcast service, according to an embodiment of the present invention.

FIG. 5 is a flowchart illustrating a service guide transmission method of a BSDA for a broadcast service, according to an embodiment of the present invention.

The BSDA 103 creates the service guide fragments required for composing an integrated service guide supporting all the classes of terminals and supported by the service provider in step 501.

The BSDA 103 creates a list of service guide fragments per terminal class in step 502. Specifically, the BSDA 103 creates the <DeviceClassGroupingCriteria> element reflecting the service guide fragments required to compose the service guides available for respective terminal classes, and creates the list of service guide fragments based on the <DeviceClassGroupingCriteria> element.

The <DeviceClassGroupingCriteria> element includes a Class element and a Profile element. The Class element indicates the terminal classes for which the service guides included in the <DeviceClassGroupingCriteria> element are provided.

The Profile element is used to filter terminal classes identified with the Class element more precisely. The Profile element includes the profiles of the terminals, i.e. the capability and preference information such as hardware and software information, network information, supportable service information, etc. The Profile element provides information about terminal capabilities for which the service guide included in the <DeviceClassGroupingCriteria> is created. The Profile element can be created using the OMA User Agent Profile (UAProf) or Device Capability (DCAP) technology. The BSDA 103 creates the SGDD with reference to the <DeviceClassGroupingCriteria> in step 503.

The BSD 103 determines whether to transmit the service guide fragments for all of the terminal classes depending on the transmission system of the network in step 504.

If it is determined to transmit the service guide fragments for all of the terminal classes, the BSDA 103 transmits the service guide fragments and ends the process.

If it is determined not to transmit the service guide fragments, the BSDA 103 determines whether there is a request for the service guide fragments in step 505. If there is a request for the service guide fragments, the BSDA 103 transmits the requested service guide fragments in step 506 and ends the process. The terminal 105 can check the SGDU list in the SGDD to determine whether all of the service guide fragments required for composing the service guide are received. When there are missing service guide fragments, the terminal 105 can request the missing service guide fragments.

If there is no request for the service guide fragments at step 505, the BSDA 103 ends the process.

As described above, the service guide transmission/reception methods and apparatuses for broadcast service according to embodiments of the present invention provide the user with a service guide supporting multiplay service, thereby improving management efficiency and user convenience especially for multi-device users.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A service guide reception method of a terminal, comprising the steps of:

receiving service guide delivery information;
extracting a list of terminal classes supporting a service guide from the service guide delivery information, wherein the service guide delivery information comprises the list of terminal classes supporting the service guide;
selecting a terminal class matched to the terminal from the list of terminal classes;
receiving a Service Guide Data Unit (SGDU) comprising service guide information required for composing the service guide matched to the selected terminal class; and
displaying the service guide composed using the service guide information received by means of the SGDU.

2. The service guide reception method of claim 1, wherein extracting the list of the terminal classes comprises:
extracting device class grouping information from the service guide delivery information,
wherein the device class grouping information comprises a class element describing terminal classes supporting the service guide and a profile element describing terminal capabilities required for processing the service guide.

3. A service guide transmission method comprising the steps of:
creating service guide fragments that constitute a service guide for all terminal classes supported by a service provider;
creating device class grouping information comprising a list of terminal classes supporting the service guide;
generating service guide delivery information comprising the device class grouping information;
transmitting the service guide delivery information to a terminal through a service guide announcement channel; and
transmitting, if a request for at least one of the created service guide fragments corresponding to a terminal class, from among the list of terminal classes, matched to the terminal is received from the terminal, the requested at least one service guide fragment to the terminal.

4. The service guide transmission method of claim 3, wherein the device class grouping information comprises a class element describing terminal classes supporting the service guide and a profile element describing terminal capabilities required for processing the service guide.

5. A service guide reception system comprising:
a terminal for receiving service guide delivery information, extracting a list of terminal classes supporting a service guide from the service guide delivery information, selecting a terminal class matched to the terminal from the list of terminal classes, receiving a Service Guide Data Unit (SGDU) comprising service guide information that is required for composing the service guide matched to the selected terminal class, and displaying the service guide composed using the service guide information received by means of the SGDU, wherein the service guide delivery information comprises the list of terminal classes supporting the service guide.

6. The service guide delivery system of claim 5, wherein the terminal extracts device class grouping information from the service guide delivery information, and the device class grouping information comprises a class element describing terminal classes supporting the service guide and a profile element describing terminal capabilities required for processing the service guide.

7. A service guide transmission system comprising:
a broadcast server for creating service guide fragments that constitute a service guide for all terminal classes supported by a service provider, creating device class grouping information comprising a list of terminal classes supporting the service guide, generating a service guide delivery information comprising the device class grouping information, transmitting the service guide delivery information to a terminal through a service guide announcement channel, and transmitting, if a request for at least one of the created service guide fragments corresponding to a terminal class, from among the list of terminal classes, matched to the terminal is received from the terminal, the requested at least one service guide fragment to the terminal.

8. The service guide transmission system of claim 7, wherein the device class grouping information comprises a class element describing terminal classes supporting the service guide and a profile element describing terminal capabilities required for processing the service guide.

* * * * *